US012754438B2

(12) United States Patent
Lampen

(10) Patent No.: US 12,754,438 B2
(45) Date of Patent: Oct. 6, 2026

(54) HEAD-UP DISPLAY WITH CONSTANT ORIENTATION OF THE VIRTUAL IMAGE PLANE IN THE EVENT OF EYE-BOX ADJUSTMENT

(71) Applicant: Bayerische Motoren Werke Aktiengesellschaft, Munich (DE)

(72) Inventor: Sebastian Takeshi Lampen, Tokyo (JP)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 328 days.

(21) Appl. No.: 18/571,766

(22) PCT Filed: May 25, 2022

(86) PCT No.: PCT/EP2022/064344
§ 371 (c)(1),
(2) Date: Dec. 19, 2023

(87) PCT Pub. No.: WO2023/006275
PCT Pub. Date: Feb. 2, 2023

(65) Prior Publication Data

US 2024/0288700 A1 Aug. 29, 2024

(30) Foreign Application Priority Data

Jul. 26, 2021 (DE) ..................... 10 2021 119 272.2

(51) Int. Cl.
*G02B 27/01* (2006.01)
*B60K 35/231* (2024.01)
*B60K 35/233* (2024.01)

(52) U.S. Cl.
CPC ........ *G02B 27/0179* (2013.01); *B60K 35/231* (2024.01); *B60K 35/233* (2024.01);
(Continued)

(58) Field of Classification Search
CPC ............ G02B 27/0179; G02B 27/0101; G02B 2027/013; G02B 2027/0181; B60K 35/233; B60K 35/231
(Continued)

(56) References Cited

U.S. PATENT DOCUMENTS

2017/0115485 A1 4/2017 Saito et al.
2020/0201054 A1 6/2020 Masuya et al.

FOREIGN PATENT DOCUMENTS

CN 211786365 U 10/2020
DE 10 2014 226 354 A1 6/2016
(Continued)

OTHER PUBLICATIONS

International Search Report (PCT/ISA/210) issued in PCT Application No. PCT/EP2022/064344 dated Sep. 23, 2022 with English translation (4 pages).
(Continued)

*Primary Examiner* — William Choi
(74) *Attorney, Agent, or Firm* — Crowell & Moring LLP

(57) ABSTRACT

A projection unit for a field-of-vision display device for a vehicle includes an imaging unit for generating a light beam bundle having a display content; a mirror which is disposed in the beam path of the light beam bundle and has a first adjustment apparatus configured to tilt the mirror for adjustment to different eye-box positions of different users; and a second adjustment apparatus configured to tilt the imaging unit or an additional optical component such that image orientation is maintained. The projection unit is configured to generate a virtual display image in a virtual image plane in the field of vision of the user by outputting the light beam bundle toward a reflective pane, by which the light beam bundle is reflected to the eye-box of the user. The tilt is
(Continued)

configured such that the virtual image plane has the same predefined orientation for the different eye-box positions.

11 Claims, 3 Drawing Sheets

(52) U.S. Cl.
CPC .... *G02B 27/0101* (2013.01); *G02B 2027/013* (2013.01); *G02B 2027/0181* (2013.01)

(58) Field of Classification Search
USPC ............................................. 359/630; 345/7
See application file for complete search history.

(56) References Cited

FOREIGN PATENT DOCUMENTS

| | | | |
|---|---|---|---|
| DE | 10 2017 208 339 | A1 | 11/2018 |
| DE | 11 2018 003 382 | T5 | 3/2020 |
| EP | 3 719 561 | A1 | 10/2020 |

OTHER PUBLICATIONS

German-language Written Opinion (PCT/ISA/237) issued in PCT Application No. PCT/EP2022/064344 dated Sep. 23, 2022 with English translation (8 pages).

German Search Report issued in German Application No. 10 2021 119 272.2 dated Apr. 11, 2022 with partial English translation (16 pages).

HEAD-UP DISPLAY WITH CONSTANT ORIENTATION OF THE VIRTUAL IMAGE PLANE IN THE EVENT OF EYE-BOX ADJUSTMENT

BACKGROUND AND SUMMARY

The invention relates to a projection unit for a field-of-view display apparatus, which can be used in particular in a motor vehicle or another land vehicle, aircraft or watercraft. The field-of-view display apparatus is configured to generate a virtual display image superposed into the field of view of a user by way of reflection at a reflection panel arranged in the field of view of the user, in particular a windshield of the vehicle. The invention is also directed to a method for operating the projection unit and a corresponding field-of-view display apparatus and a vehicle equipped therewith.

Field-of-view display apparatuses are known in particular under the designation head-up display (HUD). In a motor vehicle, for example, a desired display content, such as an indication of a speed limit or other useful navigation and vehicle control notifications or entertainment contents, can thus be overlaid, in the form of a virtual display image, on the real environment image in front of the vehicle that is observed by the driver or by another occupant.

For this purpose, a field-of-view display apparatus of conventional construction comprises a projection unit disposed below an upper side of the instrument panel. The projection unit includes a picture-generating unit, for example a display, for generating a light beam with the display content.

The projection unit of conventional construction furthermore comprises a suitable imaging and projection optical unit to project the light beam onto the windshield of the motor vehicle or onto a combiner panel provided in front of it in a manner such that the light beam is reflected thereby to the eyes of the user, producing the virtual display image in the user's field of view.

The imaging and projection optical unit in the beam path downstream of the display typically comprises a folding mirror for space-saving folding of the beam path and furthermore a concave mirror, which serves for example for image magnification and/or compensation of a windshield curvature. For adapting the beam propagation direction of the light beam to different eye positions of different users in the vehicle, it is furthermore known to kinematically adjust the concave mirror, for example tilt it about a horizontal axis for adapting to different eye heights. However, this may entail as a side-effect an undesired change in the orientation of the virtual image plane, as a result of which different users see the virtual display image in differently tilted virtual image planes.

It is an object of the present invention to specify a projection unit for a field-of-view display apparatus with which it is possible to avoid an undesired change in an orientation of the virtual image plane during the adaptation of the light beam to different eye positions of the users. It is also an object of the invention to specify a corresponding operating method, a field-of-view display apparatus, and a vehicle equipped therewith.

This object is achieved by a projection unit, by an associated operating method, by a corresponding field-of-view display apparatus, and by a vehicle equipped therewith according to the claimed invention. All further progressing features and effects stated in the claims and the subsequent description for the projection unit also apply with respect to the operating methods thereof, to the field-of-view display apparatus, and to the vehicle, and also vice versa.

According to a first aspect, a projection unit for a field-of-view display apparatus is provided, which may be configured in particular for use in a motor vehicle or another arbitrary land vehicle, aircraft or watercraft. The field-of-view display apparatus can be in particular a head-up display (HUD).

The projection unit has a picture-generating unit (PGU), which is configured to generate a light beam with a desired display content. It may be any suitable picture-generating apparatus, for example a display such as a liquid crystal display (LCD), LCOS (liquid crystal on silicon) or a self-luminous display on μLED or OLED basis, or a DMD (digital micromirror device) apparatus and many more.

In the beam path of the light beam generated by the picture-generating unit, the projection unit comprises a suitable imaging and/or projection optical unit having at least one mirror. For example, the mirror may be a concave mirror or a free-form mirror or a folding mirror in the form of a plane mirror.

The field-of-view display apparatus, which will be described further below, comprises here, in addition to the projection unit, a generally at least partially transparent reflection panel, which is arranged outside of the projection unit, in the field of view of the user, and may be formed for example by a windshield of the vehicle or configured as a specifically provided combiner panel. The projection unit is designed to emit a light beam with the display content in a suitable manner in the direction of such a reflection panel such that it is reflected by the latter to the eyes of the user, thereby producing a virtual display image in the user's field of view in front of or behind the reflection panel (in a virtual image plane).

The projection unit furthermore comprises a first adjustment device, which is configured to tilt the aforementioned mirror for adaptation of a beam propagation direction of the light beam to an individual eye position and thus also eyebox position of a user. Eyebox is typically understood here to mean a spatial region appropriate for the user's eyes, from which the virtual display image is visible without obstruction. The beam propagation direction of the light beam is defined for example by its central ray, which emanates from a midpoint of the picture-generating unit (for example a midpoint of a display surface) and leads into a center of the spatial region (eyebox) from which the virtual display image is visible to the user. Owing to the aforementioned mirror tilting by way of the first adjustment device, the central ray and consequently also the eyebox position can be adapted in a known manner to the individual position of the eyes of a user (in the vehicle etc.).

The projection unit furthermore comprises a second adjustment device, which is configured for image-orientation-maintaining tilting of the picture-generating unit or a further optical component in the beam path of the light beam (for example a holographic optical element etc.). This image-orientation-maintaining tilting is defined and implemented here such that the virtual image plane in which the virtual display image is generated always has the same predetermined spatial orientation (for example horizontal, or at a predetermined tilt angle of, purely by way of example, 30°, 45° or 90° in relation to a specified reference plane) at the various eyebox positions.

For example, if the projection unit of a HUD for a motor vehicle is designed to generate the virtual display image in a horizontal virtual image plane, generally the orientation of the virtual image plane is also changed during the eyebox adaptation by way of a mirror adjustment using the first adjustment device, with the result that the virtual image plane is no longer oriented horizontally after the eyebox adaptation. However, a different orientation of the virtual image plane for different users is often not desirable. Depending on the application and type of presentation, this may even greatly disturb the perceptibility of the virtual display image.

One idea for the present projection unit thus consists in actively compensating for this undesirable change in spatial orientation of the virtual image plane by way of the second kinematic adjustment device, which is arranged for example directly at the picture-generating unit or at a further optical component (i.e. not the mirror that is adjusted for adapting the eyebox) in order to move it.

The second adjustment device can—like the first adjustment device—be configured in principle in any way suitable for the kinematics described herein. By way of example, it may be a motor or an actuator of a different type, which is designed for controlled and precise shifting and/or tilting of the picture-generating unit or the relevant optical component.

In particular, the second adjustment device can be configured to tilt the picture-generating unit or the further optical component about its midpoint, from which the aforementioned central ray of the light beam emanates or on which it is incident. Alternatively or additionally, the first adjustment device may also be configured to tilt the mirror about its midpoint, on which the central ray of the light beam is incident.

In one specific configuration, the mirror that is tiltable by the first adjustment device is a concave mirror, which may be designed for example for image magnification and/or for compensating for a windshield curvature of a vehicle. In particular, a folding mirror (for example a plane mirror) for the space-saving folding of the beam path of the light beam may furthermore be arranged in the beam path between the picture-generating unit and the concave mirror.

According to a further aspect, a method for operating the projection unit of the type presented here is provided. The method comprises the following steps.

First, the aforementioned mirror is tilted by way of the first adjustment device to adapt the beam propagation direction of the light beam to a current eye position of a user, as a result of which an eyebox position that is individually appropriate for the user is set. The ascertainment of the respectively appropriate eyebox position may be implemented, for example, fully automatically on the basis of a signal from an eye tracking device, but alternatively may also be settable at least in part manually or in another manner (such as by voice recognition etc.) by the user themselves. This mirror tilting, however, does not generally change only the beam propagation direction of the light beam, but also an orientation of the virtual image plane in which the virtual display image is generated.

In order to compensate for this change in orientation, an image-orientation-maintaining tilt of the picture-generating unit or of a further optical component is carried out automatically by way of the second adjustment device at the same time or in part parallel or subsequently thereto. In this way, a desired predetermined orientation of the virtual image plane which remains the same for different eyebox positions can be attained. (The predetermined orientation can mean a horizontal or vertical or interposed virtual image plane, depending on the respective application, as will be illustrated further below with the example of a motor vehicle and the associated coordinate system.)

According to a further aspect, a field-of-view display apparatus is provided, which can be configured in particular for use in a motor vehicle or a different arbitrary land vehicle, aircraft or watercraft. It may be a head-up display (HUD), for example.

As was already mentioned further above, this field-of-view display apparatus comprises a projection unit of the type presented here and a reflection panel arranged in the field of view of a user, which is configured to reflect the light beam emitted by the projection unit to a spatial region (eyebox) intended for the eyes of the user. Here, the configuration and the mutual arrangement of the projection unit and the reflection panel are designed such that a virtual display image in front of or behind the reflection panel is presented to the user looking through the reflection panel. The reflection panel can in particular be at least partially transparent to the ambient light that is incident from the rear, such that the user can see through it both the surrounding area and also a virtual display image overlaying the surrounding area.

In particular, the field-of-view display apparatus can furthermore comprise a control unit for operating the projection unit, which projection unit is configured and set up to automatically carry out a method described herein.

According to a further aspect, a vehicle, in particular a motor vehicle, or another arbitrary land vehicle, aircraft or watercraft, is provided. The vehicle comprises a windshield and, located below it, an instrument panel. The vehicle furthermore comprises a field-of-view display apparatus of the type presented herein, the reflection panel of which is formed by the windshield or a combiner panel arranged in front of it on the inside of the vehicle and whose projection unit is arranged in the instrument panel.

According to one embodiment, the aforementioned predetermined same orientation of the virtual image plane in the different eyebox positions corresponds to a substantially horizontal plane in correspondingly different vertical poses. As a result, a virtual display image can be presented as lying in the road surface for example for a driver of a motor vehicle. A horizontal plane can be defined, for example, in a conventional Cartesian vehicle coordinate system by a vehicle longitudinal axis and a vehicle transverse axis.

In particular, the first adjustment device can be configured to tilt the aforementioned mirror about a horizontal axis of the mirror to adapt the beam propagation direction of the light beam to different eyebox heights of the user in the vehicle. In this case, the terms “horizontal”, “height” and “vertical” can be defined in relation to the conventional Cartesian vehicle coordinate system with a horizontal vehicle longitudinal axis, a horizontal vehicle transverse axis, and a vertical vehicle height axis.

Alternatively or additionally, the second adjustment device can also be configured for image-orientation-maintaining tilting of the picture-generating unit or the stated further optical component about a horizontal axis of the picture-generating unit or of the further optical component.

The aforementioned aspects of embodiments and specific configurations of the invention will be explained in more detail below with reference to the examples illustrated in the appended drawings. The drawings are kept purely schematically for illustrative purposes. They should therefore not be considered to be true to scale.

DETAILED DESCRIPTION OF THE DRAWINGS

Figure 2:
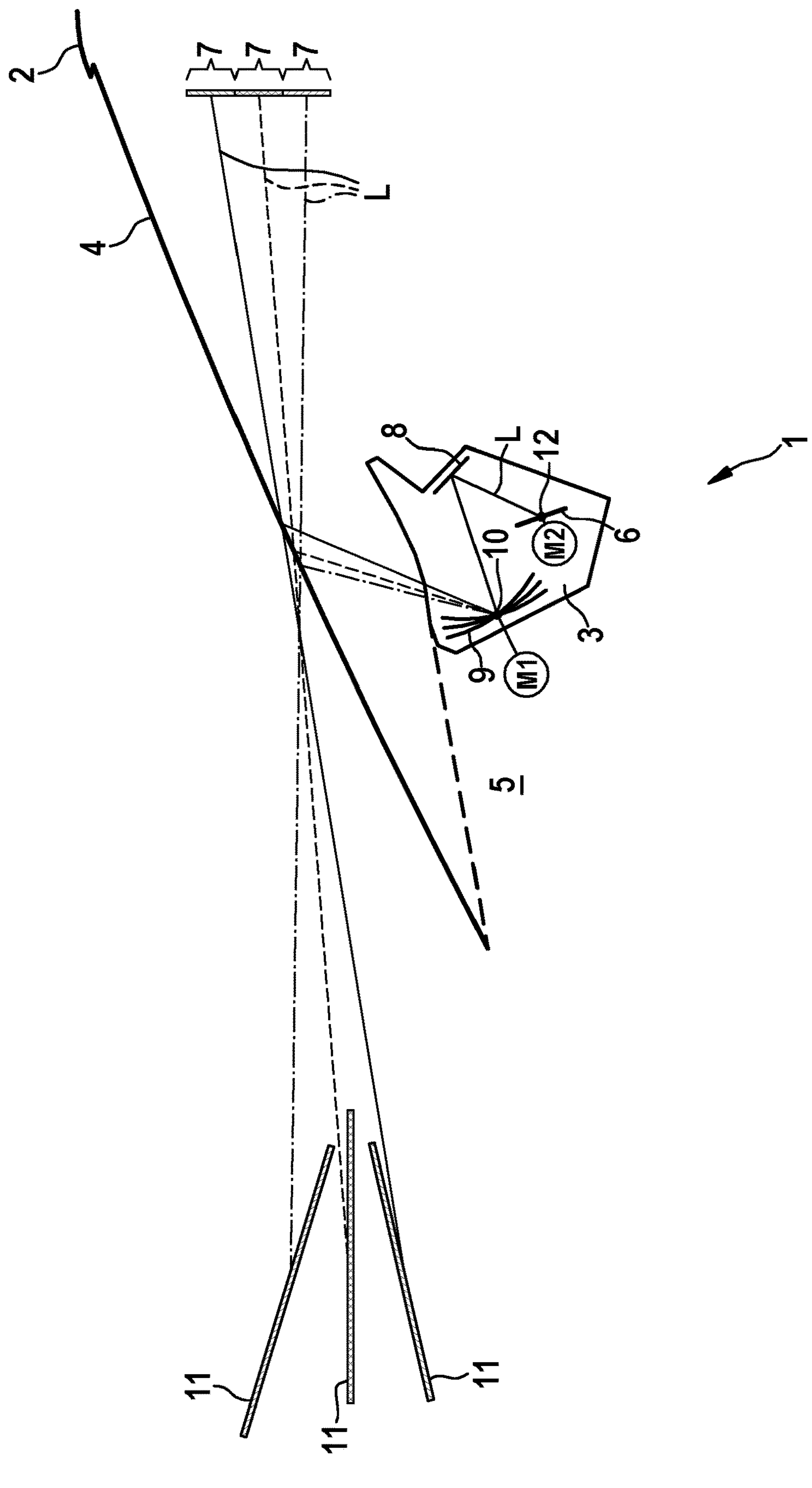
FIG. 2 shows temporary intermediate states of the field-of-view display apparatus of FIG. 1, which are shown in isolation only for illustration purposes and would each be present after a tilt of a concave mirror for adapting the eyebox position.
Figure 3:
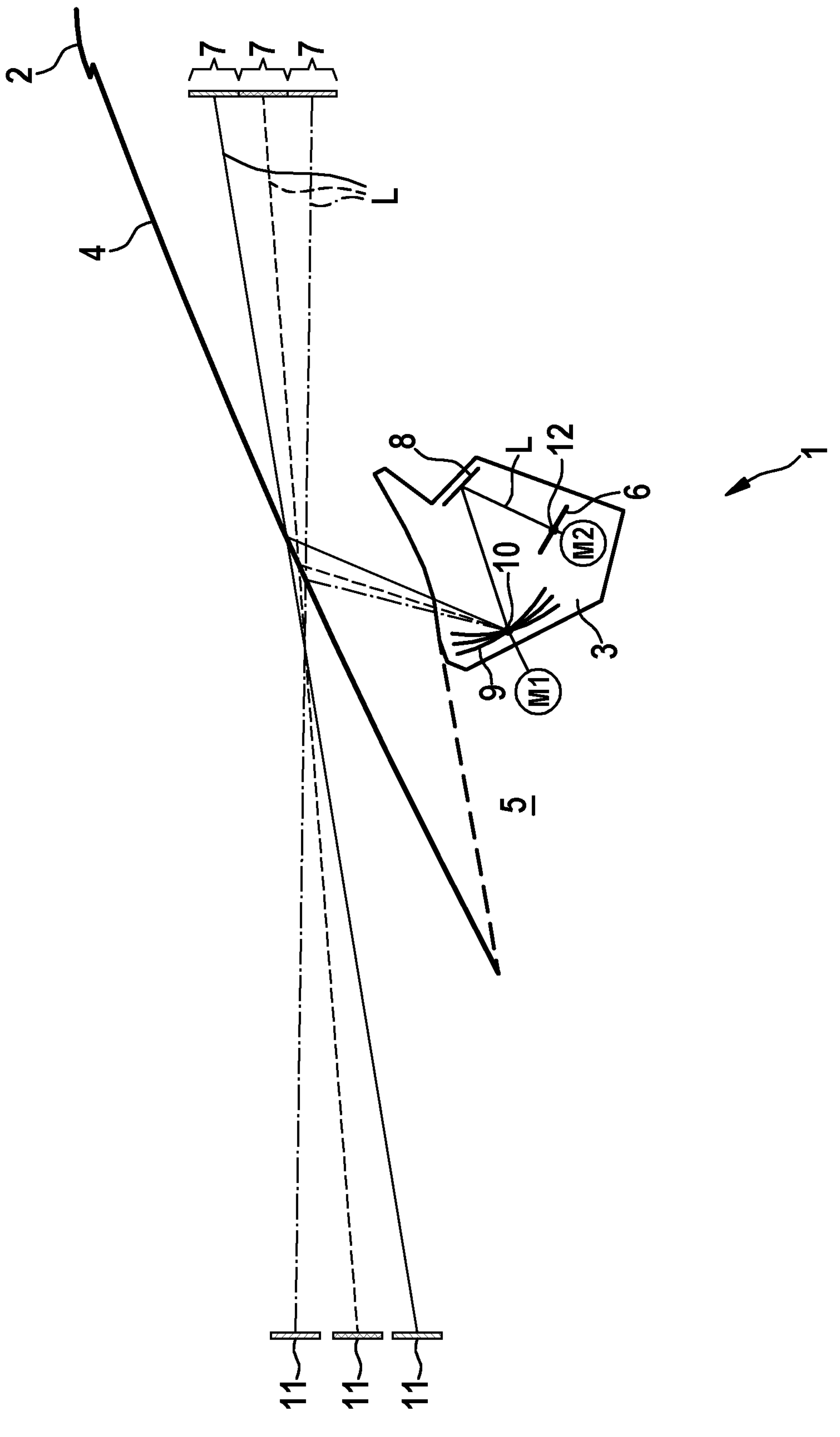
FIG. 3 shows a lateral cross-sectional view of a vehicle with a field-of-view display apparatus of the type presented here, as an alternative to FIG. 1, which field-of-view display apparatus is configured to generate virtual display images in a vertical virtual image plane.

All different embodiments, variants and specific configuration features of the projection unit, of the field-of-view display apparatus, of the method and of the vehicle according to the aforementioned aspects of the invention, as mentioned further above in the description and in the following claims, can be implemented in the examples shown in FIGS. 1 to 3. For this reason, these will not be repeated below. The same is true analogously for the term definitions and effects relating to individual features, which are shown in FIGS. 1-3, as already indicated further above.

Figure 1:
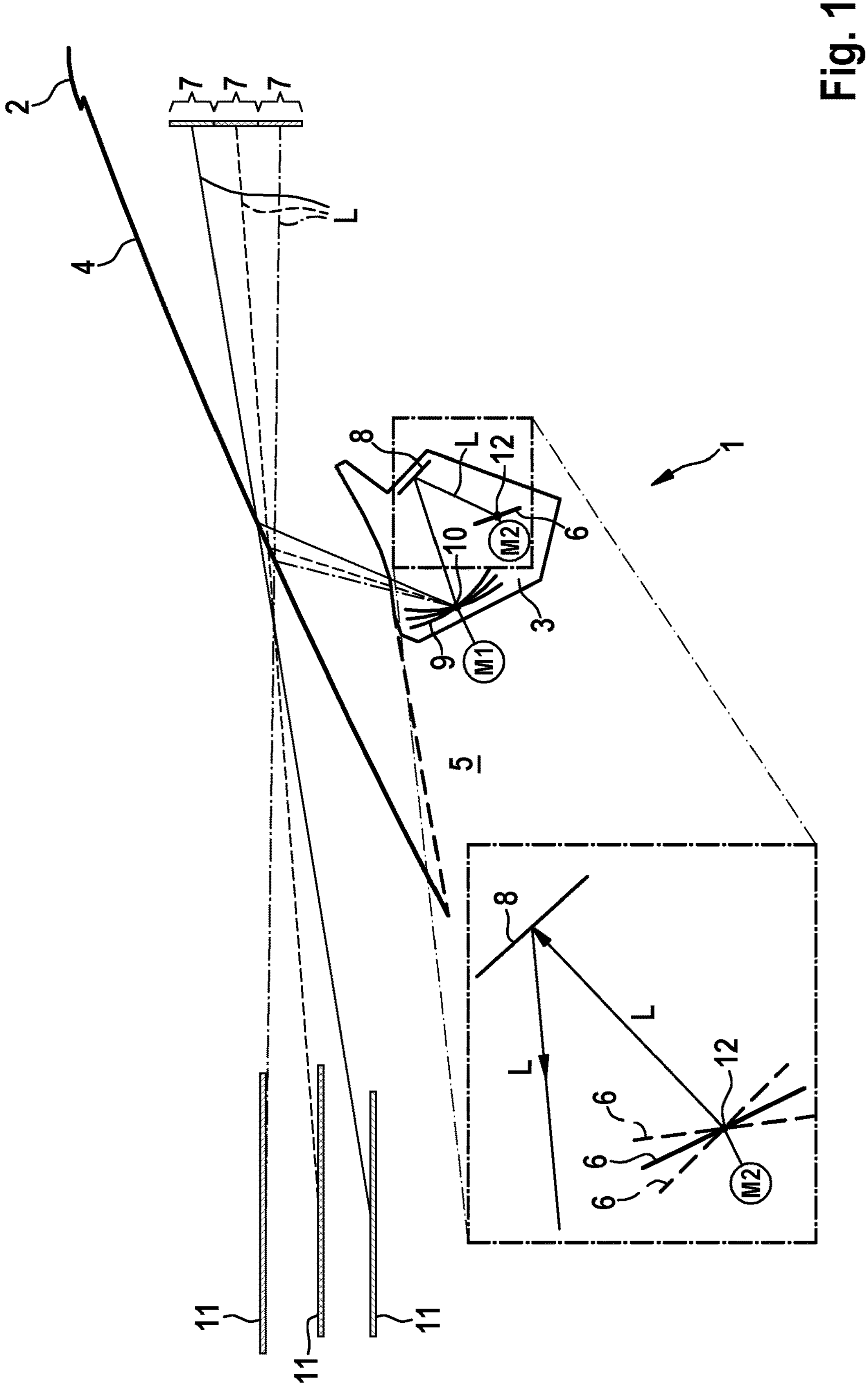
FIG. 1 shows a lateral cross-sectional view of a vehicle with a field-of-view display apparatus of the type presented herein, which is configured to generate virtual display images in a horizontal virtual image plane, using three different eyebox positions as examples.

FIG. 1 shows, in a greatly simplified, schematic lateral cross-sectional view, an example of a field-of-view display apparatus 1 of the type presented herein for a vehicle 2, which in this example is a motor vehicle.

The field-of-view display apparatus 1 in this example is configured in the form of a head-up display (HUD) and comprises a projection unit 3 of the type presented herein. The vehicle 2 is illustrated in FIG. 1 by its windshield 4 and, arranged therebelow, an instrument panel 5 (indicated only schematically) with the projection unit 3 that is disposed therein.

The projection unit 3 comprises a picture-generating unit 6, which in this case is configured in the form of a display merely by way of example. The picture-generating unit 6 is designed to generate a light beam L with a desired display content.

The light beam L in FIGS. 1-3 is illustrated, for the purposes of explaining its beam path, by way of a central ray, which emanates from a display center and leads into a center of an eyebox 7. The eyebox 7 is here understood to be a two-dimensional spatial region transversely to the beam propagation direction, and which is intended for the eyes of a user of the field-of-view display apparatus 1 (in the present case a driver of the motor vehicle, who is not shown). The light beam L (its central ray) and the eyebox 7 are illustrated schematically in each case for three different users with mutually differing eye heights.

The projection unit 3 furthermore comprises, for optically folding the light beam L generated by the picture-generating unit 6, a folding mirror 8, which is configured in the form of a plane mirror in this example. A concave mirror 9, which additionally shapes the light beam L in a suitable manner and steers it in the direction of the windshield 4 of the vehicle 2, is additionally arranged in the beam path of the light beam L, which is redirected by the folding mirror 8, in the projection unit 3.

To adapt the beam propagation direction of the light beam L to different eyebox positions, a first adjustment device M1 in the form of a motor is provided in the projection unit 3. The motor is configured to tilt the concave mirror 9 about its centrally located horizontal axis 10. FIG. 1 schematically shows three different tilt poses of the concave mirror 9, which produce the illustrated three different positions of the eyebox 7 for three drivers of different height.

The windshield 4 in the field-of-view display apparatus 1 serves as a reflection panel reflecting the light beam L emitted by the projection unit 3 to the respective eyebox 7 of the driver, with the result that a virtual display image (not illustrated further) behind the windshield 4 is produced in the driver's field of view. In the example shown in FIG. 1, the field-of-view display apparatus 1 is configured and set up to generate the virtual display image in each case in a horizontal virtual image plane 11.

As is illustrated in FIG. 2 in a temporary intermediate state of the field-of-view display apparatus 1, or in such an intermediate state viewed in isolation, the stated tilt of the concave mirror 9 (viewed in isolation) results in a change in height of the virtual image plane 11, which is typically not disturbing for the applications. In addition, however, the stated tilt of the concave mirror 9 also changes the orientation of the virtual image plane 11, which means that the desired horizontal pose of the virtual image plane 11 in FIG. 2 is present only for the central eyebox position. For the eyebox positions lying above and below, the orientation of the virtual image plane 11, by contrast, differs significantly from the horizontal orientation.

As is shown in FIG. 1, to solve this problem the projection unit has a second adjustment device M2 in the form of a further motor, which is configured to tilt the picture-generating unit 6 so as to maintain the image orientation. As is illustrated schematically in the enlarged section of FIG. 1, at the same time or immediately afterward, the picture-generating unit 6 is also tilted about its central horizontal axis 12 matching every tilt of the concave mirror 9 in this example, with the result that the virtual image plane 11 has the predetermined same orientation (in this example horizontal) in all three different eyebox positions.

FIG. 3 shows a lateral cross-sectional view of a vehicle 2 with a field-of-view display apparatus 1 of the type presented here, which is an alternative to FIG. 1 and is configured to generate virtual display images in a vertical virtual image plane 11. What was stated above in relation to FIG. 1 can apply analogously to the rest in this case too.

LIST OF REFERENCE SIGNS

1 Field of view display apparatus
2 Vehicle
3 Projection unit
4 Windshield
5 Instrument panel
6 Picture-generating unit
7 Eyebox (two-dimensional)
8 Folding mirror
9 Concave mirror
10 Horizontal axis of the concave mirror
11 Virtual image plane
12 Horizontal axis of the picture-generating unit
L Light beam
M1 First adjustment device
M2 Second adjustment device

What is claimed is:

1. A projection unit for a field-of-view display apparatus for use in a vehicle, the projection unit comprising:

a picture-generating unit for generating a light beam with a display content;

a mirror, arranged in a beam path of the light beam, having a first adjustment device, which is configured to tilt the mirror for adapting a beam propagation direction of the light beam to different eyebox positions of different users; and a second adjustment device, which is configured for an image-orientation-maintaining tilt of the picture-generating unit or of a further optical component in the beam path of the light beam, wherein:

the projection unit is configured to generate a virtual display image in a virtual image plane in a field of view of a user by outputting the light beam in a direction of a reflection panel which is arranged in the field of view of the user and by which the light beam is reflected to the user's eyebox; and the image-orientation-maintaining tilt is configured such that the virtual image plane has a same predetermined orientation for different eyebox positions.

2. The projection unit according to claim 1, wherein:

the second adjustment device is configured such that the picture-generating unit or the further optical component is tilted about its midpoint, from which a central ray of the light beam emanates or on which the central ray of the light beam is incident.

3. The projection unit according to claim 1, wherein:

the first adjustment device is configured such that the mirror is tilted about its midpoint, on which a central ray of the light beam is incident.

4. The projection unit according to claim 1, wherein:

the mirror that is tiltable by the first adjustment device is a concave mirror.

5. The projection unit according to claim 4, wherein:

a folding mirror for folding the beam path of the light beam is arranged in the beam path of the light beam between the picture-generating unit and the concave mirror.

6. A method for operating the projection unit according to claim 1, the method comprising:

performing a tilt of the mirror by the first adjustment device for adapting the beam propagation direction of the light beam to a current eyebox position of the user; and simultaneously therewith or subsequently thereto, performing the image-orientation-maintaining tilt of the picture-generating unit or of the further optical component by the second adjustment device.

7. A field-of-view display apparatus for use in a vehicle, the field-of-view display apparatus comprising:

the projection unit according to claim 1; and a reflection panel, which is arranged in the field of view of the user and is configured to reflect the light beam output by the projection unit to the user's eyebox, intended for eyes of the user, for generating a virtual display image in front of or behind the reflection panel in the user's field of view.

8. A vehicle comprising:

a windshield;

an instrument panel arranged below the windshield; and the field-of-view display apparatus according to claim 7, wherein:

the projection unit is arranged in the instrument panel, and the reflection panel is formed by the windshield or a combiner panel arranged in front of the windshield on an inside of the vehicle.

9. The vehicle according to claim 8, wherein:

a same predetermined orientation of the virtual image plane in the different eyebox positions corresponds to a substantially horizontal plane in respectively different vertical poses.

10. The vehicle according to claim 8, wherein:

the first adjustment device is configured to tilt the mirror about its horizontal axis to adapt the beam propagation direction of the light beam to different eyebox heights of the user in the vehicle.

11. The vehicle according to claim 8, wherein:

the second adjustment device is configured for an image-orientation-maintaining tilt of the picture-generating unit or of the further optical component about its horizontal axis.

* * * * *